April 3, 1956  O. CORDIER ET AL  2,740,387
DIESEL ENGINE

Filed March 27, 1952  5 Sheets-Sheet 1

INVENTORS
Otto Cordier
and
Walter Gerecke
By Walter Berhm
Patent Agent

April 3, 1956 O. CORDIER ET AL 2,740,387
DIESEL ENGINE
Filed March 27, 1952 5 Sheets-Sheet 2

INVENTORS
Otto Cordier
and
Walter Gerecke
By Walter Becker
Patent Agent

April 3, 1956  O. CORDIER ET AL  2,740,387
DIESEL ENGINE

Filed March 27, 1952  5 Sheets-Sheet 3

INVENTORS
Otto Cordier
and
Walter Gerecke
By Walter Becker
Patent Agent

April 3, 1956  O. CORDIER ET AL  2,740,387
DIESEL ENGINE

Filed March 27, 1952  5 Sheets-Sheet 4

INVENTORS
Otto Cordier and
Walter Gerecke
BY
Patent Agent

April 3, 1956     O. CORDIER ET AL     2,740,387
DIESEL ENGINE

Filed March 27, 1952                             5 Sheets-Sheet 5

INVENTORS
Otto Cordier and
Walter Gerecke
By
Patent Agent

United States Patent Office 2,740,387
Patented Apr. 3, 1956

2,740,387
DIESEL ENGINE

Otto Cordier, Koln-Kalk, and Walter Gerecke, Koln-Sulz, Germany, assignors to Klöckner-Humboldt-Deutz Aktiengesellschaft, Koln, Germany Application March 27, 1952, Serial No. 278,892

Claims priority, application Germany April 28, 1951

6 Claims. (Cl. 123—32)

The present invention relates to diesel engines, and, more particularly to air cooled diesel engines in which the fuel is directly injected into a combustion chamber provided in the cylinder head and offset from the cylinder space.

The development of air cooled diesel engines has shown that there are numerous elements and arrangements which, while having proved advantageous in connection with water cooled engines, cannot be simply transferred to air cooled diesel engines. One important member in this connection is, for instance, the combustion chamber. While the design of the combustion chamber of water cooled engines is primarily dictated by technical aspects of the internal combustion process, it is necessary with air cooled diesel engines, in addition to the said aspects, also to consider the possibilities of cooling the injection nozzle. With air cooled diesel engines the injection nozzle becomes hotter than with water cooled diesel engines. Consequently, with air cooled diesel engines there exists the danger that when the fuel cokes, the nozzle opening becomes clogged up. There exists two possibilities of preventing such coking and clogging up of the nozzle opening. Thus, the fuel injection nozzle may be operated at a temperature at which the fuel burns at said nozzle opening. However, it is better to operate the fuel injection nozzle at a temperature at which no coking of the fuel occurs.

In view of the above, it is an object of the present invention to provide an improved arrangement of the combustion chamber associated with the nozzle which will avoid coking and clogging up of the nozzle opening.

It is another object of this invention so to design the combustion chamber adjacent the fuel injection nozzle of an air cooled diesel engine that the injection nozzle will become too hot.

It is still another object of this invention to provide an arrangement of the combustion chamber adjacent the fuel injection nozzle of air cooled diesel engines by shaping the cooling fins adjacent said injection chamber in such a manner that they will have an increased cooling effect on the injection nozzle.

These and other objects and advantages of the invention will appear more clearly from the following specification in connection with the accompanying drawing, in which Fig. 1 illustrates a vertical section through the upper part of the cylinder and the cylinder head of one embodiment of the invention.

Figure 7:
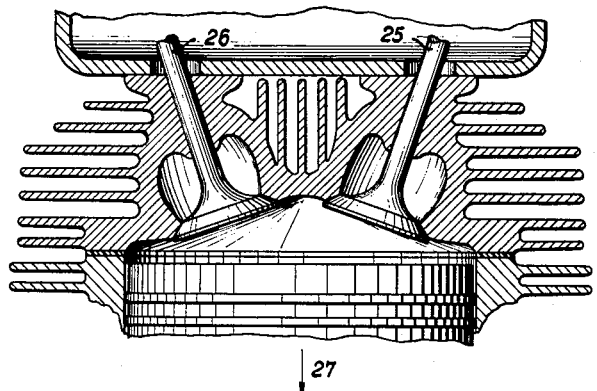
Figure 8:
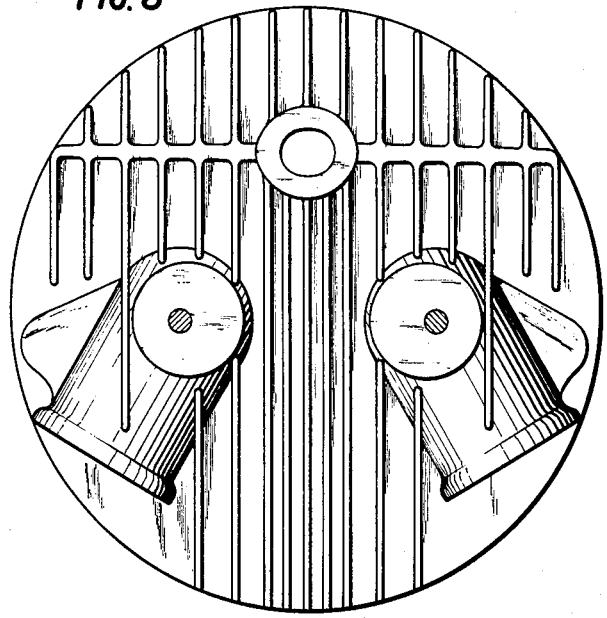
Figure 9:
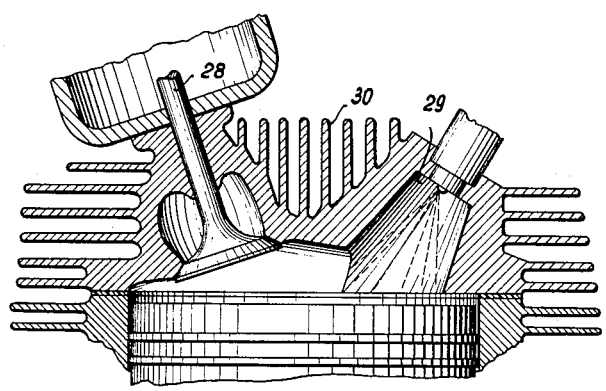
Figure 10:
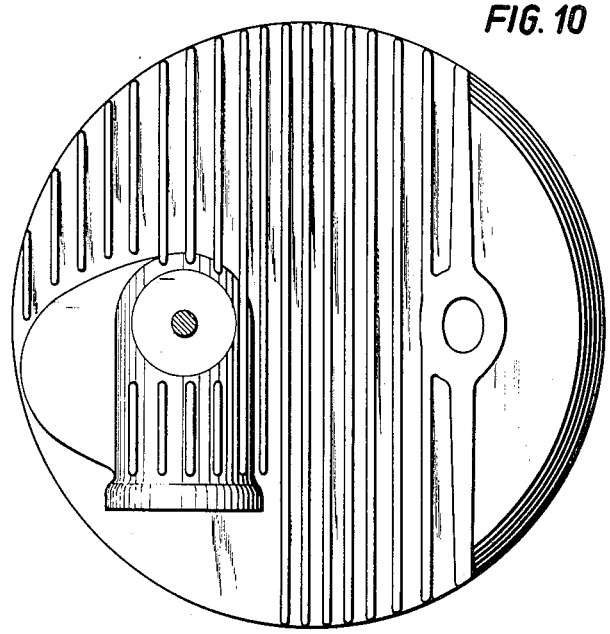

Figs. 7 and 8 respectively show in section and plan view a further modification of a cylinder head according to the invention, and Figs. 9 and 10 respectively show in section and plan view still another modification of the cylinder head according to the invention.

General arrangement

The problem of so designing the combustion chamber that the injection nozzle will not get too hot, is solved according to the present invention by shaping the combustion chamber slightly conical in such a manner that the bottom of the cone is adjacent the cylinder space. More specifically, the combustion chamber associated with the injection nozzle is somewhat separate from the cylinder space and slopes from the injection nozzle, remote from the cylinder space at a slight inclination toward said cylinder space so that the nozzle is relatively far from the main combustion chamber. With water cooled diesel engines, combustion chambers of similar shapes are known per se. However, with regard to air cooled engines, a number of important advantages result which show their importance only with this type of engine.

One advantage of the combustion chamber arranged according to the present invention consists in that the nozzle is relatively far away from the main combustion chamber. A very important factor for the utility of the combustion chamber according to the present invention in connection with air cooled diesel engines consists in that in such combustion chamber there will not occur any great gas velocities during the compression and combustion stroke. In this way, little of the compression and combustion heat is transferred to the walls and the nozzle.

Figure 1:
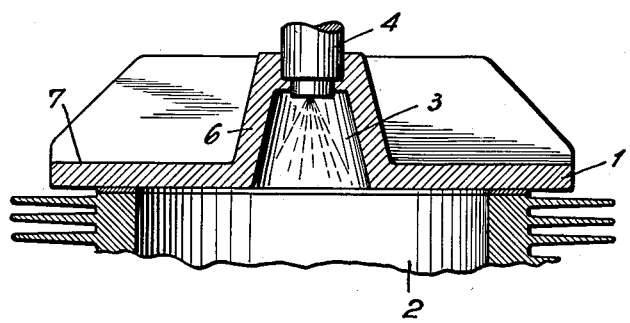
Figure 2:
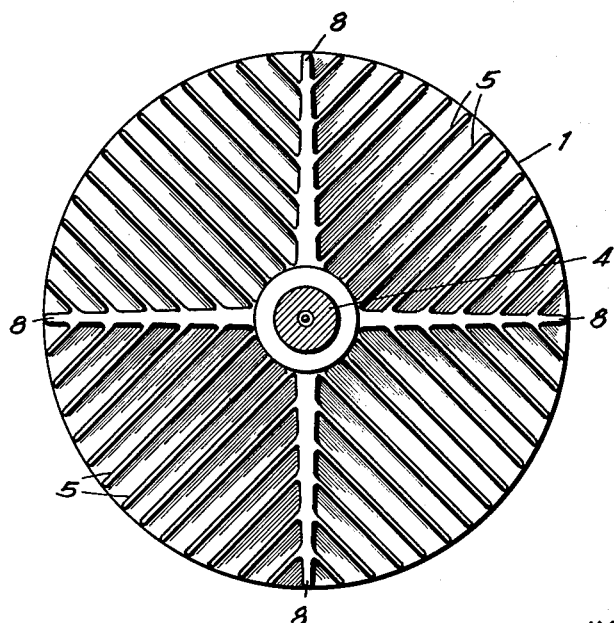
Fig. 2 shows the cylinder head of Fig. 1 seen from above.

Referring now to the drawing in detail, and Figs. 1 and 2 thereof in particular, the structure shown therein represents the upper part of a cylinder and cylinder head of an air cooled diesel engine with direct injection of the fuel. To this end, the cylinder head 1 is provided with a combustion chamber 3 which is set off from the cylinder space 2. The combustion chamber 3 has a slightly conical shape which widens from the injection nozzle 4 towards the cylinder space 2. According to the design shown in Figs. 1 and 2, the longitudinal central axis of the combustion chamber 3 coincides with the axis of the cylinder. However, it is to be understood that the longitudinal central axis of the combustion chamber may also be arranged parallel to the cylinder axis or at an angle thereto. If the longitudinal central axis of the combustion chamber 3 is inclined to the cylinder axis, it may intersect the cylinder axis or cross the same.

As shown particularly in Fig. 2, the cooling fins 5 on the cylinder head 1 radiate like beams from the wall 6 of the combustion chamber. According to this arrangement, the upper surface 7 of the cylinder head 2 is sub-divided into sectors by a plurality of strong cooling fins 8. Within these sectors, the cooling fins 5 run parallel to each other and are connected with the stronger cooling fins 8.

The cylinder head shown in Figs. 1 and 2 is not provided with an inlet and outlet valve as is, for instance, the case with two-stroke-cycle diesel engines. However, as shown in connection with Figs. 3 and 4, the invention is not limited to such two-stroke-cycle diesel engines but it is also applicable with all its advantages to diesel engines in which the cylinder head is provided with valves. Said valves may be valves for the inlet and outlet or valves either for the inlet only or for the outlet only.

Figure 3:
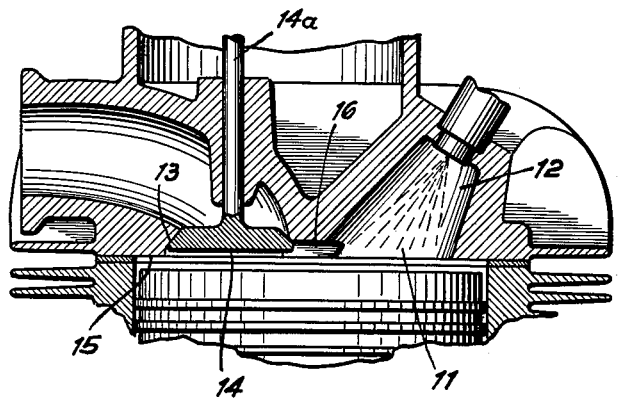
Fig. 3 is a longitudinal section through the upper part of the cylinder and the cylinder head of another embodiment of the invention.
Figure 4:
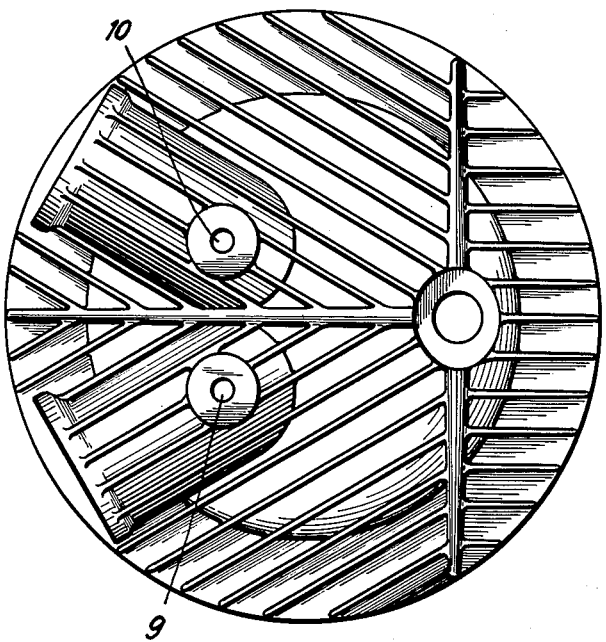
Fig. 4 is a top view of the structure shown in Fig. 3.
Figure 5:
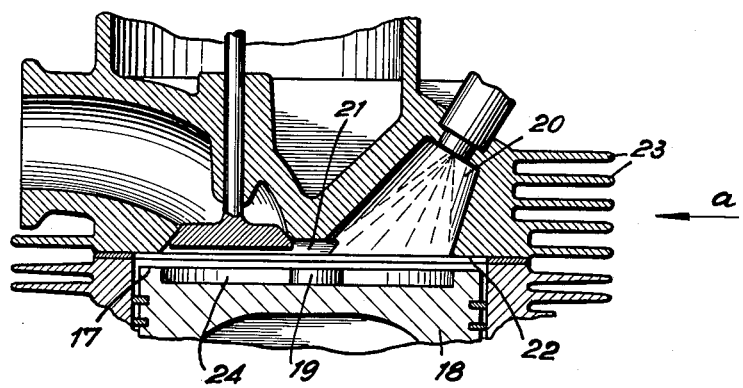
Fig. 5 is a vertical section through the upper part of the cylinder and the cylinder head of still another embodiment of the invention.
Figure 6:
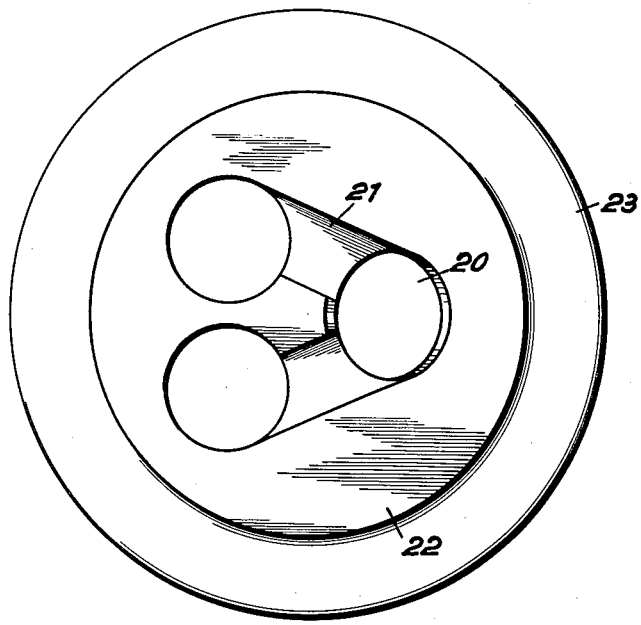
Fig. 6 shows the cylinder head of Fig. 5 seen from below.

The structure shown in Figs. 3 and 4 concerns a four-stroke-cycle diesel engine with an inlet valve 9 and an outlet valve 10. The characteristic feature of the diesel engine according to Figs. 3 and 4 consists in that the nozzle 11 of the combustion chamber 12 and the valve seats 13 are arranged relative to each other so that they form the apices of a triangle. In this construction, the valve seats 13 are arranged in the recesses or depressions 14 provided in the bottom 15 of the cylinder head so as to allow an appropriate stroke of the valves which latter are designated with the reference numeral 14a. In order to enable the air in the depressions 14 to take part in the combustion, the depressions 14 communicate with the combustion chamber 12 through grooves 16 in the bottom 15 of the cylinder head. However, as shown in Figs. 5 and 6, the head surface 17 of the piston 18 may be provided with depressions 24 for allowing the valve stroke. The said depressions 24 then communicate through corresponding grooves 19 in the head surface 17 of the piston 18 with the combustion chamber 20.

Fig. 5 additionally shows that naturally, in addition to the grooves 19 there may also be provided grooves 21 in the bottom surface 22 of the cylinder head. It will be seen from Fig. 6 that for purposes of improving the combustion, the grooves 16, 19 and 21 may tangentially run to the orifice of the combustion chambers 12 and 20, respectively. According to Figs. 3 and 5, the longitudinal central axis of the combustion chamber is inclined with regard to the cylinder axis. This, however, is by no means a necessity. The longitudinal central axis of the combustion chamber may also be parallel to the cylinder axis.

The advantages of the combustion chambers 3, 12 and 20, respectively, may still be materially improved by properly shaping the cooling fins associated therewith. First of all, it is of particular advantage that with a diesel engine in which the cooling air is blown against the cylinder head in a direction transverse to the cylinder axis, the combustion chamber be located at the leading side, i. e. at the side facing the on-coming air. In this instance, as shown in Fig. 5, the combustion chamber is at the leading side of the cylinder provided with cooling fins 23 which face the cooling air stream indicated by the arrow a and have their major surfaces located in planes perpendicular to the cylinder axis. With such an arrangement, as shown in Fig. 4, the cooling fins provided on the trailing side of the combustion chamber may extend parallel to each other while being inclined to said cooling fins at the leading side of the cylinder. For the passage of cooling air between the cooling fins on the cylinder head, it may be advantageous if, in a manner known per se, the longitudinal central axes of the valves are inclined to a plane passing through the central longitudinal axis of the combustion chamber and intermediate the valves in such a manner that the distance between the longitudinal central axes increases with the increasing distance from the valve seats. Such an arrangement is shown in Figs. 7 and 8, in which the valves are indicated by the reference numerals 25 and 26, while the direction of flow of the oncoming air is indicated by the reference numeral 27.

It may additionally be mentioned that the invention is also applicable to such diesel engines in which, in addition to the combustion chamber in the cylinder head there is provided only one single valve for the inlet or outlet. With such a diesel engine, the longitudinal central axes of the combustion chamber and the valves preferably form an angle with each other in such a manner that, as shown in Figs. 9 and 10, the distance between the longitudinal central axes increases with increasing distance from the bottom surface of the cylinder head. The cooling fins 30 of such a cylinder head extend advantageously in a direction transverse to a plane passing through the longitudinal axes of the valve 28 and the combustion chamber 29. It is, of course, understood that in such an instance the cooling air is blown against the cylinder head from the side in a direction transverse to the said plane.

It is furthermore to be understood that the present invention is, by no means, limited to the particular constructions shown in the drawings, but also comprises any modifications within the scope of the appended claims.

What we claim is:

1. In combination in a cylinder head for air-cooled diesel engines: a substantially flat bottom portion, a slightly cone-shaped portion extending upwardly from said bottom portion and confining a combustion chamber, a fuel injection nozzle mounted in the top wall of said combustion chamber, and cooling fins extending upwardly from said bottom portion and having their major surfaces substantially perpendicular to the major surface of said bottom portion, said cooling fins fanning out from the wall of said combustion chamber.

2. In combination in a cylinder head for air-cooled diesel engines: a substantially flat bottom portion, a slightly cone-shaped portion extending upwardly from said bottom portion and confining a combustion chamber, a fuel injection nozzle mounted in the top wall of said combustion chamber, a first set of cooling fins extending radially from the wall of said combustion chamber toward the periphery of the cylinder head, and a second set of cooling fins branching off from said first set of cooling fins at an acute angle thereto and extending toward the periphery of said cylinder head, the cooling fins of said first set being thicker than the cooling fins of said second set.

3. A cylinder head for air-cooled diesel engines according to claim 2, in which the combustion chamber is arranged centrally with regard to the periphery of the cylinder head.

4. In combination in a cylinder head for air-cooled diesel engines: a substantially flat bottom, a slightly cone-shaped portion extending upwardly from said bottom and confining a combustion chamber, the cross-section of said combustion chamber gradually decreasing from said bottom, first cooling fins arranged on said bottom and radiating from the wall of said combustion chamber, and second cooling fins thicker than said first cooling fins and extending from the wall of said combustion chamber toward the periphery of said cylinder head, said second cooling fins subdividing said bottom with said first cooling fins into a plurality of sectors, the first cooling fins respectively arranged within one and the same sector extending parallel to each other and being connected to the adjacent second cooling fins.

5. A cylinder head for air-cooled diesel engines according to claim 2, in which said combustion chamber confined by said slightly cone-shaped portion is arranged eccentrically with regard to the periphery of the cylinder head.

6. A cylinder for air-cooled diesel engines according to claim 2, in which said combustion chamber confined by said slightly cone-shaped portion is eccentrically arranged with regard to the central axis of said cylinder head, and in which two valves are respectively arranged on opposite sides of the plane passing through said central axis of said cylinder head and the central axis of said combustion chamber, the central major plane of one cooling fin of said first set coinciding with the plane passing through said central axis of said cylinder head and the central axis of said combustion chamber.

References Cited in the file of this patent

UNITED STATES PATENTS

| 1,671,826 | Joslyn | May 29, 1928 |
| 2,013,006 | Obram | Sept. 3, 1935 |
| 2,410,946 | Johnson | Nov. 12, 1946 |

FOREIGN PATENTS

| 644,000 | France | Sept. 29, 1928 |
| 875,511 | France | June 22, 1942 |
| 330,990 | Great Britain | June 23, 1930 |
| 233,261 | Switzerland | Oct. 2, 1944 |